United States Patent [19]

Gauthier

[11] Patent Number: 5,757,797
[45] Date of Patent: May 26, 1998

[54] ATM MULTIPLEXING DEVICE WITH TREE AND DATE CIRCUITS

[76] Inventor: Jean-Pierre Gauthier, Street 7, Alleé du Josas, 78350 Jorry en Josas, France

[21] Appl. No.: 623,649

[22] Filed: Mar. 28, 1996

[30] Foreign Application Priority Data

Mar. 29, 1995 [FR] France ................ 9503693

[51] Int. Cl.$^6$ .................................. H04L 12/56
[52] U.S. Cl. ................................. 370/395; 370/420
[58] Field of Search ........................ 370/391, 395–399, 370/409, 412, 420, 463, 905, 230, 232–234

[56] References Cited

U.S. PATENT DOCUMENTS 5,684,798  11/1997  Gauthier ............................ 370/395

FOREIGN PATENT DOCUMENTS

0632669A1  1/1995  European Pat. Off.
9407664    6/1994  France .

OTHER PUBLICATIONS

A.S. Sethi, "A Model for Virtual Tree Bandwidth Allocation in ATM Networks," IEEE Infocom, pp. 1222–2239, Apr. 6, 1995.

"ATM User–Network Interface Specification Version 3.0" by the ARM Forum, Sep. 1993., pp. 85–86.

"Asynchronous Transfer Mode", by Martin de Prycker, Alice Horwood Series, Britain 1991.

*Primary Examiner*—Douglas W. Olms
*Assistant Examiner*—Matthew C. Phillips
*Attorney, Agent, or Firm*—Venable, Baetjer Howard & Civiletti, LLP

[57] ABSTRACT

A communication system, such as an ATM network, is disclosed having a multiplexing device formed by a plurality of access terminals for users who have cells to be transmitted at a certain rate, and at least one connecting terminal. An allocation circuit determines, at a current date, the supply of a cell (called chosen cell) to the connecting terminal. The allocation circuit includes a circuit for producing a first destination identifier (VP), a theoretical date determining circuit, a tree circuit, a sub-tree circuit, a root date determining circuit, and an extracting circuit. The theoretical date determining circuit is for determining a theoretical date for the transmission of the available cells of each service circuit as a function of the rate. The tree circuit is for presenting "leaves" for receiving the theoretical dates for each service circuit, a root for containing dates called root dates, on the basis of which dates a date called priority date is established from the theoretical dates, and nodes connecting said leaves to said root. The sub-tree circuit is for selecting leaves from the leaves of the tree circuit in response to the first destination identifier, and for creating a partition in the first destination identifier. The root date determining circuit is for determining at least one root date in said partition. The extracting circuit is for determining the chosen cell based upon the root dates.

5 Claims, 10 Drawing Sheets

ATM MULTIPLEXING DEVICE WITH TREE AND DATE CIRCUITS

BACKGROUND OF THE INVENTION

1. Field of the Invention

The present invention relates to a communication system comprising at least a network of the ATM type, notably a network in which information cells comprising a first destination identifier which defines a set of destinations, and a second destination identifier which defines a sub-set of said set, are transmitted from one of its access points to another access point, and at least one multiplexing device comprising:
- a plurality of access terminals for users who have cells to be transmitted at a certain rate to a certain destination defined by said destination identifiers,
- at least one connecting terminal for at least one access point of said network,
- a plurality of service circuits connected to the access terminals, comprising queue elements for storing each the user cells which have the same destination identifiers, and for rendering the stored cells available on cell outputs,
- an allocation circuit for determining the supply of a cell called chosen cell selected from the available cells to said connecting terminal via an output circuit at a current date, which allocation circuit comprises:
  a circuit for producing a first destination identifier.

The present invention also relates to a multiplexing device suitable for such a system.

2. Discussion of the Related Art

The ATM (Asynchronous Transfer Mode) technique permits to transmit different types of data (sound, image, files etc.) on the same carrier. These data are arranged in packets called cells of a normalized length of 53 octets. An address contained in the header and formed by two sub-fields, the VPI (Virtual Path Identifier) and the VCI (Virtual Channel Identifier) ensures the routing of the cells inside the ATM network. The payload content of the transmission frame is called the ATM path. A succession of ATM cells having the same VPI form a virtual path VP. The route followed by a succession of ATM cells for the same VPI and the same VCI forms a virtual circuit VC.

For accessing an ATM network, one is confronted with certain rate restraints and jitter restraints both as regards the virtual path VP and the virtual channel VC imposed for reasons of security and call charge rate. A policing system connected to the network accesses makes tests and may even suppress the cells that lead to an overhead.

The access point to the network is ensured by a multiplexing device which, in consequence, is to comprise means for arranging the cells in the ATM path, so that they correspond to this policing system and also produce the least possible jitter.

The French Patent document filed in the name of the Applicants under no. 94 07664, 22 Jun. 1994 (FR 2 721 777), describes a mechanism which is particularly suitable for regulating cells "parametered" with a maximum rate PCR (Peak Cell Rate) and a factor $\tau<1$ (jitter less than one period). As, on the one hand, in the document "ATM User-Network Interface Specification Version 3.0" by the ATM Forum, the idea of mean SCR rate (Sustainable Cell Rate) was defined in September 1993, and as, on the other hand, it becomes necessary to handle the statistical multiplexing between cell streams, the known mechanisms are thus to be modified to take account of these new requirements.

SUMMARY OF THE INVENTION

The present invention proposes a system of the type described above, which takes account of these new requirements and makes it possible to regulate the transmission of cells both at the VP level and at the VC level. Needless to observe that the invention also applies to other networks than the ATM networks.

Therefore, such a system is characterized in that the allocation circuit additionally comprises:
- a theoretical date determining circuit for determining a theoretical date for the transmission of the available cells of each service circuit as a function of, more particularly, the certain rate,
- a tree circuit presenting:
  "leaves" for receiving the theoretical dates for each service circuit,
  a root for containing dates called root dates, on the basis of which dates a date called priority date is established from the theoretical dates,
  nodes established in layers and connecting said leaves to said root,
- a sub-tree circuit for selecting leaves from the leaves of the tree circuit in response to the first destination identifier, and for creating a partition in the first destination identifier,
- a root date determining circuit for determining at least one root date in said partition.

These and other aspects of the invention will be apparent from and elucidated with reference to the embodiments described hereinafter.

DETAILED DESCRIPTION OF PREFERRED EMBODIMENTS

Figure 1:
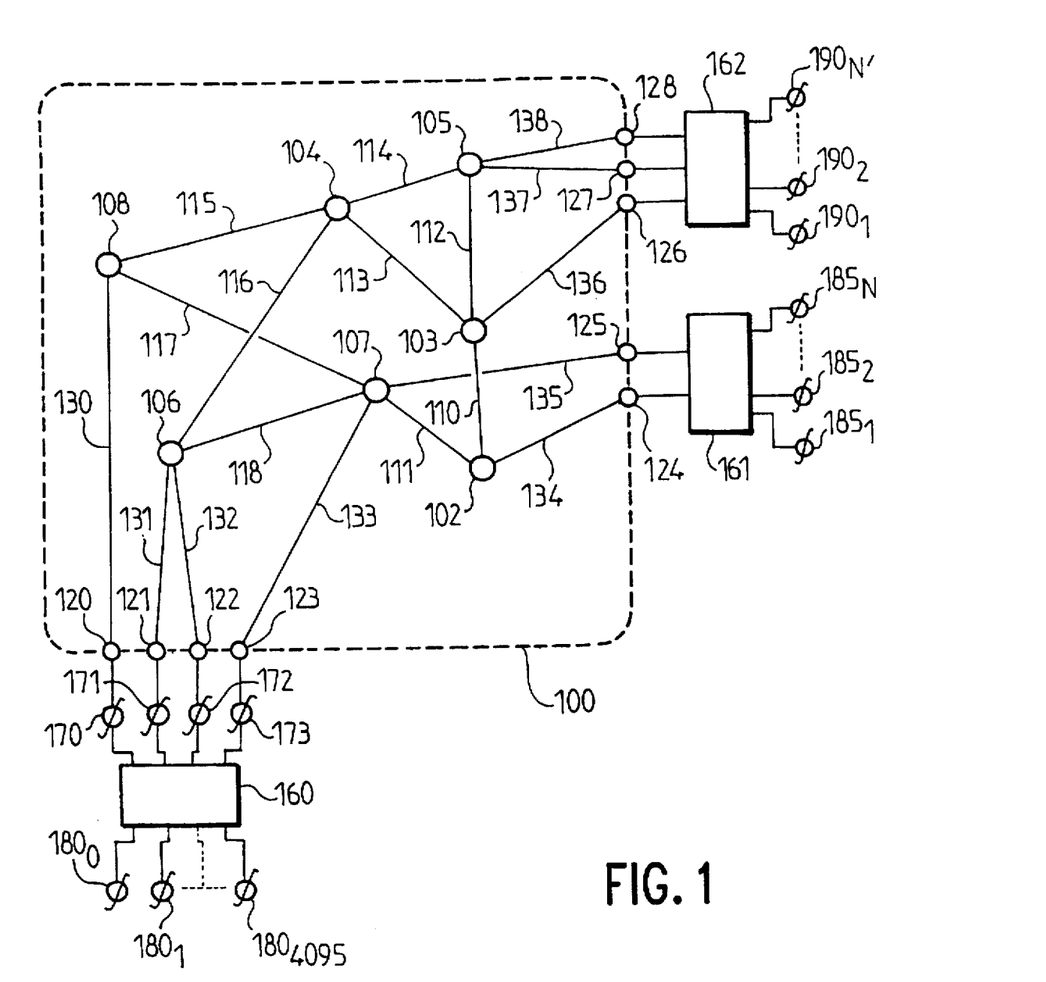
FIG. 1 shows a network to which a multiplexing device according to the invention is connected.
Figure 2:
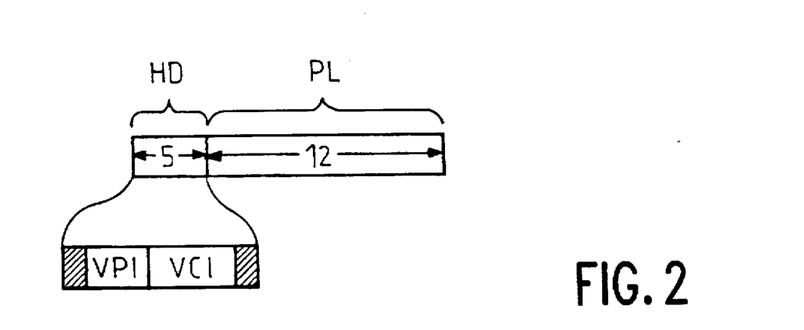
FIG. 2 shows the structure of the information cells transmitted in the network.

FIG. 1 shows in a diagrammatic manner an ATM network referenced 100 in the drawing Figure. A description of this network will be found in the publication entitled "ASYNCHRONOUS TRANSFER MODE" by MARTIN de PRYCKER, published in the ALICE HORWOOD Series in Britain in 1991. This network is formed by various nodes 102, 103, 104, 105, 106, 107 and 108, interconnected by links 110 to 118, for connecting the nodes 102–103, 102–107, 103–105, 103–104, 104–105, 104–108, 104–106, 107–108 and 106–107, respectively. Various access points to this network are designated as 120 to 128. These access points are connected to the nodes 108, 106, 107, 102, 103 and 105 via the links 130 to 138, respectively. Various multiplexing and demultiplexing devices 160, 161 and 162 are connected to these access points. Among these devices there is to be distinguished: a multiplexing device 160 which form part of the present invention, and two demultiplexing devices 161 and 162, which perform reverse operations to those of device 160 and form part of the system according to the invention. In European Patent Specification EP 0 632 669, filed 23 Jun. 1994, a description is found of such demultiplexing devices. To be connected to the four points 120, 121, 122 and 123, the multiplexing device 160 has four connecting terminals 170, 171, 172 and 173. Thus, within the scope of that described example, the information signals can go from device 160 to the devices 162 and 161 by passing through the network 100. These transmit information signals are applied to a plurality of access terminals $180_0$ to $180_{4095}$ which the multiplexing device 160 has and can be produced, for example, on output terminals $185_1$ to $185_N$ of device 161 and $190_1$ to $190_{N'}$ of device 162. The order of magnitude of N and N' is the order of one thousand. The information signals transmitted through the network are produced in the form of cells whose shape is shown in FIG. 2. These cells are formed by 53 octets of which 5 form the header HD and the 48 remaining octets referenced PL contain the data for a service to be transmitted. In the header field, two codes VPI and VCI are distinguished which correspond to virtual path identifier and virtual circuit identifier, respectively. The path identifiers are controlled by the transmission operator and the virtual circuit identifier is controlled by the user. To each VP are assigned sub-sets of VC values: a sub-set of CBR and a sub-set of VBR, itself formed by two sub-sets, a PCR and a SCR value. A data channel can be of the CBR type (Constant Bit Rate), in which case its rate is normally regulated by the source. Thus, only the jitter is optimized, without a test of the rate and an arbitration is carried out between VC values of the CBR type of the same VP to minimize the jitter.

A VC can be of the VBR type (Variable Bit Rate), which is considered to have less priority than the VC of the CBR type. It is normally characterized by its "mean" rate SCR (Sustainable Cell Rate), and its "peak" rate PCR (Peak Cell Rate). The PCR is higher than the SCR and can only hold for a specified duration (cell burst). The ATM Forum cited above defines exactly the VCR type seen from the policing point of view. The ABR type (Available Bit Rate) defined by the ATM Forum can easily be adapted to the present device. A process with an EPRCA algorithm (Enhanced Proportional Rate Control Algorithm), not described here, will dynamically modify the rate parameters linked with the virtual paths or virtual circuits.

Figure 3:
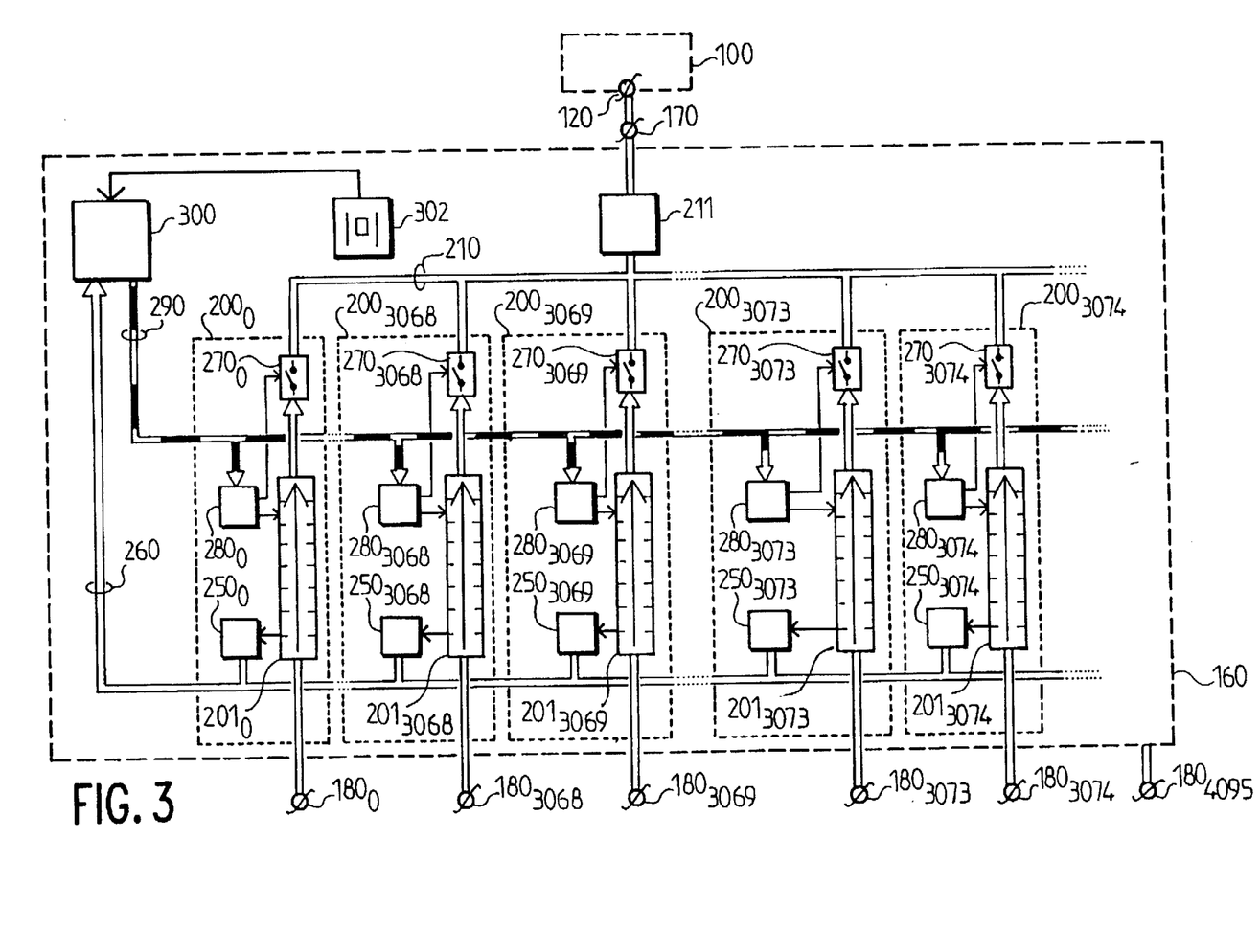
FIG. 3 shows a multiplexing device according to the invention.

FIG. 3 shows a diagram of the multiplexing device 160. For simplicity of the exposé, attention is only paid in this drawing Figure to the cells to be supplied to the terminal 170 from access terminals $180_0$ to $180_{4095}$. The priority classification has already been coded in the algorithms in an indirect way via PT_SCR and PT_SCR of the VC descriptor described in Table 1.

Each of these terminals $180_0$ to $180_{4095}$ receives cells that have the same identifiers and the same traffic constraints. Index i ($0 \leq i \leq 4095$) determines the index of the accesses $180_0$ to $180_{4095}$. The cells are stored in service circuits $200_0$ to $200_{4095}$. These various elements $200_0$ to $200_{4095}$ are formed by memories of the FIFO type $201_0$ to $201_{4095}$ queue elements, respectively. These memories restore on their output the data to the order in which they have come in. A recognition code "i" is assigned to each of these elements $200_0$ to $200_{4095}$. A common data line 210 connects the output of the queue elements to the terminal 170 via an output circuit 211 which is a simple circuit for adapting the signals to terminal 120. Each service circuit $200_0$ to $200_{4095}$ comprises a notification circuit $250_0$ to $250_{4095}$ respectively, for notifying the presence of a cell on its input. This circuit transmits this notification accompanied by the recognition code over a common line 260. The service circuits $200_0$ to $200_{4095}$ also comprise send authorization elements which are shown in the form of a switch $270_0$ to $270_{4095}$, on the one hand, and a decoding element $280_0$ to $280_{4095}$ on the other. The input of this decoding element is connected to a third common line 290 which interconnects all the service circuits $200_0$ to $200_{4095}$.

By processing the notifications transmitted over line 260, an allocation circuit 300 produces the recognition code on the last line 290 to authorize the service circuit indicated by this code to transmit a cell called chosen cell. This allocation circuit 300 operates in timing with a clock 302 which also supplies other signals (in a manner not shown) to the various elements of the multiplexing circuit.

DESCRIPTION OF THE ALLOCATION CIRCUIT (300)

Figure 4:
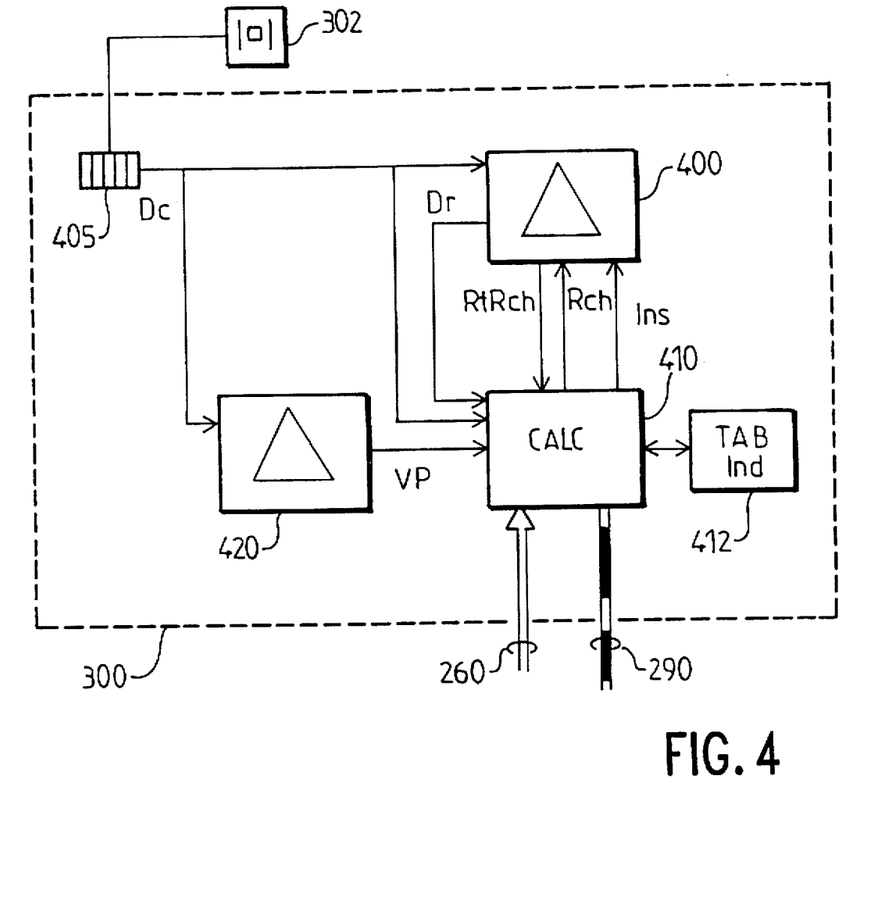
FIG. 4 shows the structure of an allocation circuit which forms part of the device of FIG. 3.

FIG. 4 shows the structure of the allocation circuit 300. It comprises a tree circuit 400, a date counter 405 which gives the current date "Dc" based upon clock signals 302. It also comprises a calculation element 410 which ensures the management of the allocation circuit 300 in collaboration with a working memory 412 which notably contains information signals linked with the various VP and VCs. A second tree circuit 420 produces the VP. This circuit 420 may advantageously be of the type described in the EP Patent Specification mentioned above, or by a cyclically polled allocation table described in European Patent Specification No. 0 618 748. The VC selected by the circuit is outputted via line 290.

Description of the Tree Structure

Figure 5:
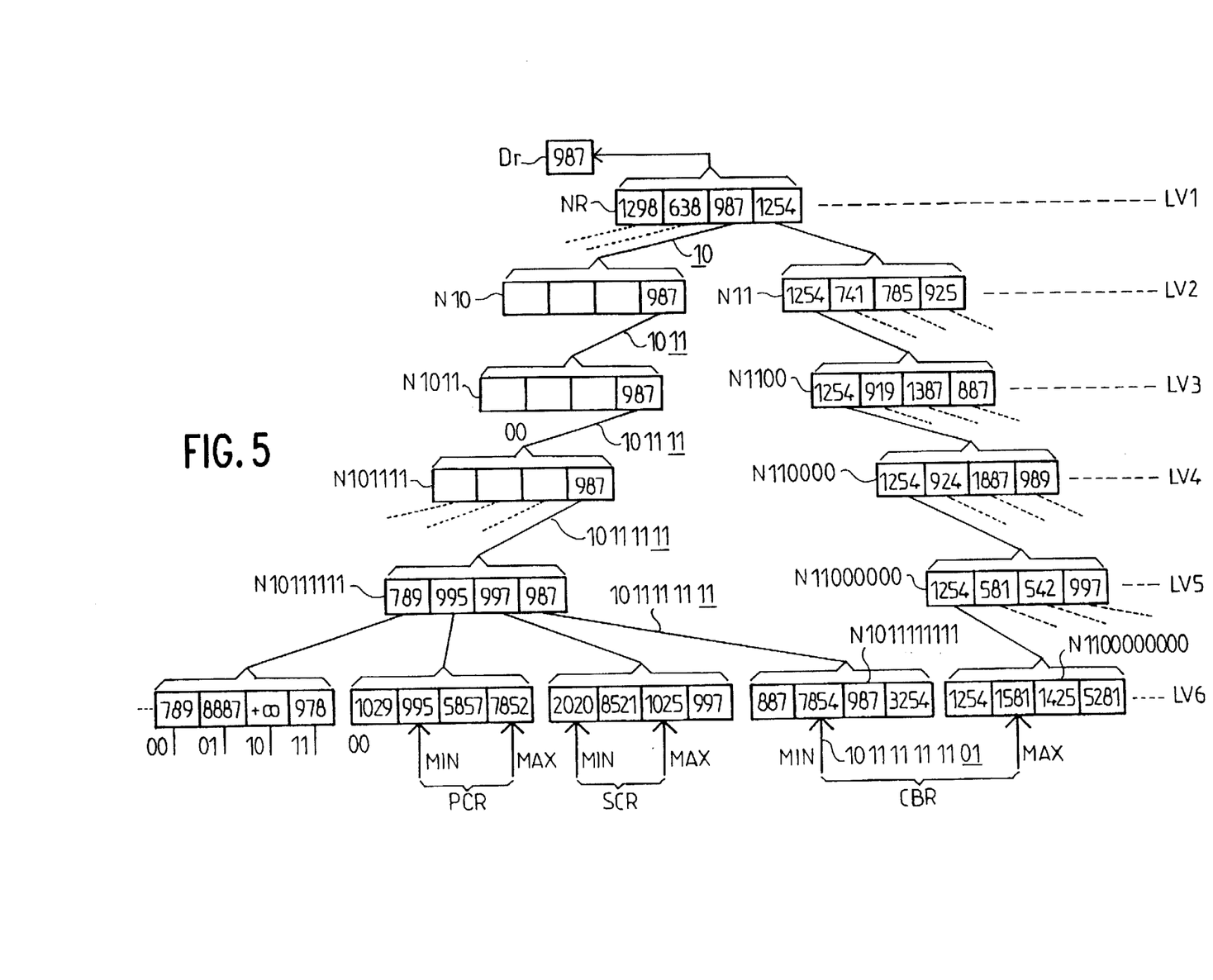
FIG. 5 shows the tree-like structure managed by the tree circuit which forms part of the system according to the invention.

FIG. 5 shows the tree structure which the tree circuit 400 is to produce.

This tree structure is of the quaternary type and is formed by six levels LV1 to LV6 comprising 1 to 1024 nodes. Each node is formed by four locations implicitly numbered from left to right "00", "01", "10" and "11". Each of these locations is connected to a node of a lower level. The locations of the last level LV6 form the leaves of the tree. The level LV1 comprises a single node, called root node, referenced NR. The level LV2 comprises four nodes whose references are formed by the letter N followed by a number in a binary order, that is: N00, N01, N10 and N11; only the nodes N10 and N11 are shown in the Figure. The level LV3 comprises 16 nodes of which only the nodes referenced N1011 and N1100 are shown. For the other levels there are thus:

LV4 64 nodes, of which only the nodes N101111 and N110000 are shown.

LV5 256 nodes, of which only the nodes N10111111 and N11000000 are shown, and

LV6 1024 nodes, of which only the nodes N1011111111 and N1100000000 are indicated.

It will be evident that the numbering of each node is formed, on the one hand, by the binary part of the node of the higher level to which it is connected and, on the other hand, by the number of the location to which it is particularly allocated.

According to the invention, the tree is divided into sub-trees. In FIG. 5 three sub-trees relating to the same VP are shown. One of these sub-trees relates to VC PCR, another one to VC SCR and the last one to VC CBR. These various sub-branches are defined by parameters MIN and MAX. In principle, each VC CBR has an input in the sub-tree CBR of its VP, while the VC VBRs have two: one input in the sub-tree SCR and the other input in the sub-tree PCR. For obtaining optimum regulation of the rates on the VC VBR of a VP, it is necessary that the inputs of a sub-tree SCR or PCR be graded in priority levels depending on the rate of their associated VC, from the higher to the lower rate, and thus from left to right of the sub-tree.

Figure 6:
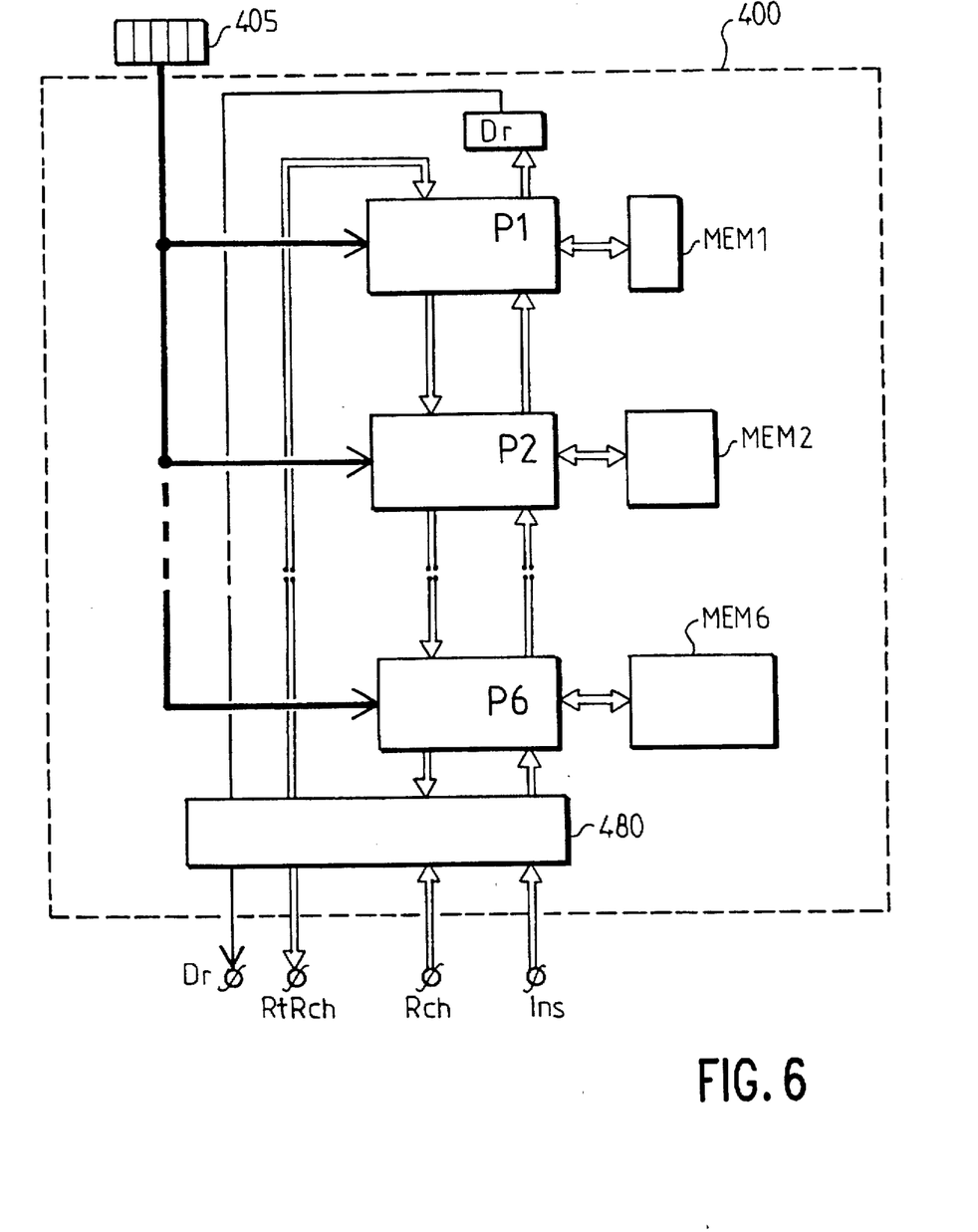
FIG. 6 shows the structure of the tree circuit.

FIG. 6 shows the structure of the tree circuit 400. This circuit 400 comprises a succession of processors P1 to P6, assigned each to a level LV1 to LV6, respectively. To the processor P1 is connected a memory MEM1 formed by a line containing four dates coming from the processor P2. To this processor P2 is connected a memory MEM2 formed by four lines containing each four dates coming from the processor P3 and so on and so forth up to the processor P6 to which is connected a memory MEM6 organized in 1024 lines which contain each four dates relating to four leaves, so that the various leaves numbered from 0 to 4095 can be processed. The leaves are intended to receive dates by insertion. The dates to be inserted into the leaves form part of the arguments of an "Ins" function.

In response to an information signal relating to a "Rch" function, the tree circuit 400 produces a result "RtRch" which represents, indirectly through the Table "Ind" 412 (FIG. 4), the number of the service circuit that is to transmit its cell. A distribution circuit 480 makes it possible to apply the information signals which have to travel in the direction of leaves-root and in the direction of root-leaves.

Figure 7:
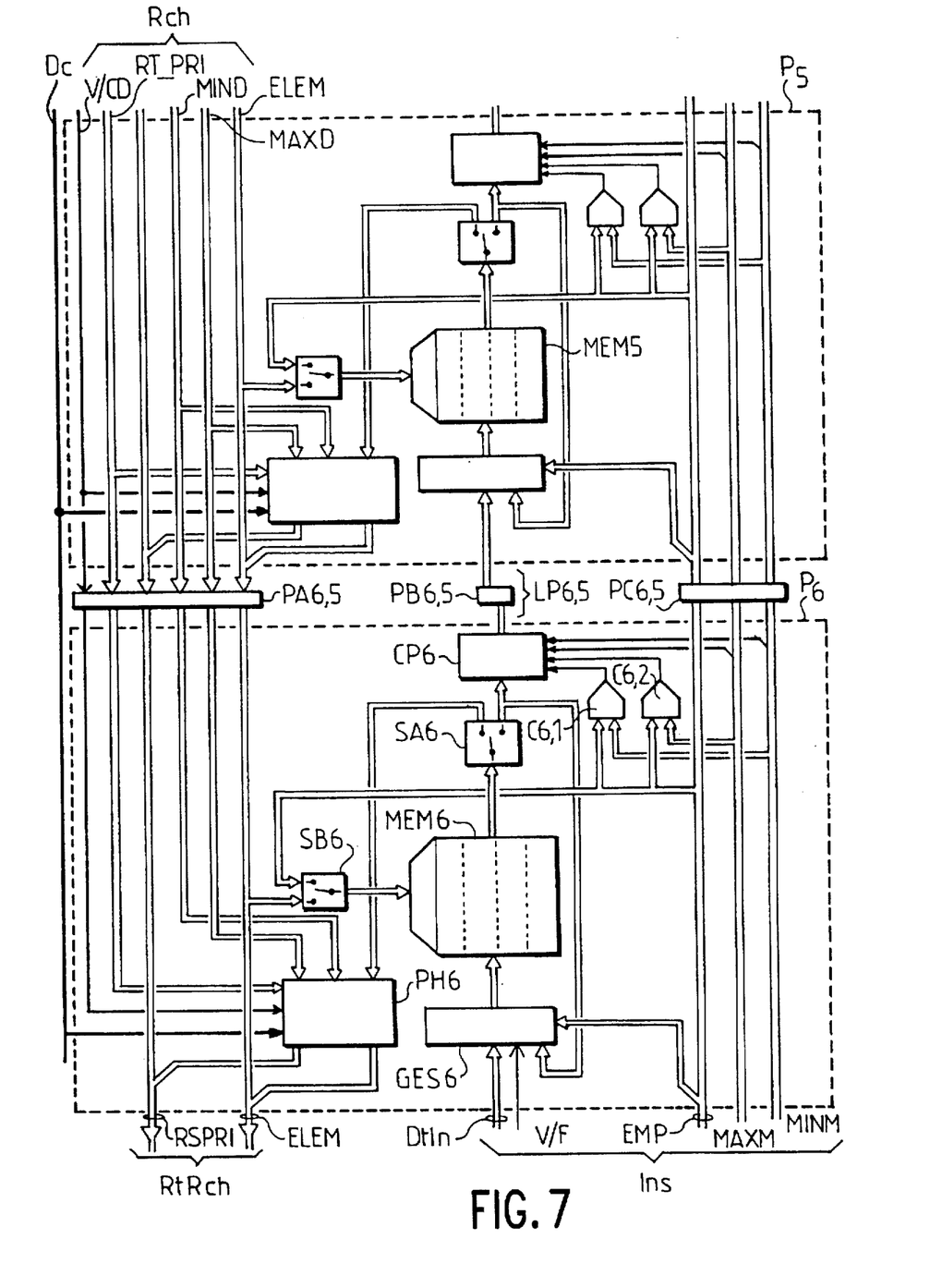
FIG. 7 shows the structure of the tree circuit in more detail.

FIG. 7 shows a detailed diagram of the structure of the processors P5 and P6. Their associated memories carry references MEM5 and MEM6, respectively.

Leaves-Root Processing

This processing relates to the arguments of the "Ins" function, that is, in the calling order:

EMP: the location of the leaf likely to receive a new date.

Dtln: the date likely to be inserted.

V/F: insertion valid or false.

MINM and then MAXM: determine the limits of the sub-tree in which one works in the indicated direction.

The two least significant bits of the information signal EMP which are denoted "$C_{EMP}$" are applied to an input management circuit GES6 to define the location of the node of level LV6, whereas the rest of the bits denoted "$N_{EMP}$" are applied to the addressing input of memory MEM6 via an addressing switch SB6 to define the number of the node. As memory MEM6 is organized in lines which contain four codes each, the management circuit GES6 has for its task to put this code in the proper line location. Therefore, in a first period of time, it stores the four stored codes in the addressed line via the two-position addressing switch SB6, via another part of the code coming from the line EMP. In a second period of time, the management circuit GES6 overwrites with the code coming from the line Dtln one of the four stored dates in response to the afore-mentioned two bits. In a third period of time, all the codes stored in this management circuit are written in the memory MEM6. In a fourth period of time, these same codes are read out again from MEM6 and offered to a date determining element CP6 which determines the date code to be transmitted on a line LP6,5.

The date determining element CP6 increases the code that has the smallest value by taking account of MINM and MAXM in the following manner:

If $N_{min}$ is noted to be the value of the node contained in MINM during $N_{EMP}$, and $C_{min}$ the value of its two bits having less significance, CP6 ignores the codes to the left of the code defined by "$C_{min}$" if $N_{min}$ is $N_{EMP}$. Similarly, if $N_{max}$ is noted to be the value of the node contained in MAXM during $N_{EMP}$, and $C_{max}$ the value of its two bits having less significance, CP6 ignores the codes to the right of the code defined by "$C_{max}$" if, however, $N_{max}=N_{EMP}$. The tests $N_{min}=N_{EMP}$ and $N_{max}=N_{EMP}$ are carried out by C6.1 and C6.2, respectively. A similar processing is carried out by the other processors P5 to P1. A register Dr finally contains the root date produced by P1 at the output of CP1. However, the presence of a signal V/F applied to the single management circuit GES6 will be noticed which, when the signal has the value FAUX, makes it possible to cancel the writing of a new date in the memory MEM6. Thus, when considering the last processor PE, it contains in its memory MEM1 the theoretical dates which have the values resulting from the choice of the preceding processors. This forms the leaves-root processing.

FIG. 5 represents the tree after an insertion with the leaves having binary notations "10 11 11 11 11 01" and "11 00 00 00 00 01", by taking these same values for values of MINM and MAXM. It will be found that Dr contains the lowest date between MIND and MAXD. An insertion at the limits of a sub-tree forms the first partitioning step of the tree (applied here to the sub-tree CBR).

Root-Leaves Processing

This processing relates to the arguments of the function "Rch", that is, in the calling order:

V/CD: permits to have two different criteria for selecting the circuit VC,

MIND and then MAXD: determine the sub-tree in which one works,

RT_PRI: gives a priority for the VCs in order to avoid that it is always the same circuits that are chosen.

The output parameters of this function "Rch" are:

ELEM: number of the leaf and from there the virtual circuit that is chosen; this number is complete by concatenation with each change of level.

RSPRI: gives a change of priority for a new selection of VC. This value constitutes the argument RT_PRI for a following search. That is to say, RSPRI crosses over at the next level to act as input RT_PRI.

The root-leaves processing consists of producing, indirectly, the address that corresponds to the leaf associated to the service circuit that is authorized to transmit its cell. This code is formed by concatenation in a similar manner to the one described in the Patent Specification mentioned above, and appears on the line ELEM. This choice is also made as a function of magnitudes MAXD and MIND, which limit this choice. Furthermore, a magnitude V/CD permits to change this criterion for making this choice. Another code is also formed by concatenation, which appears on a line RSPRI. This permits to make a turning priority as this will be described in the following with respect to the present memory.

This turning priority processing consists first of all of changing the positions of the switching circuits SA6 and SB6. The memory MEM6 is in that case addressed by a code coming from the line ELEM, a searching element PH6 whose input is connected to the data output of the memory MEM6 via the switching circuit SA6 determines the last two bits of the final code of ELEM and RSPRI. This is effected notably by comparing codes contained in the line addressed by those produced by the dating element 405. The circuits $PH_j$, with j=1 to 6, can be conceived as a function of the explanations that follow.

The circuit Phj chooses a code from those present on the output of the switching circuit SAj. For being selected, an exclusion principle analogous to the one used on insertion is applied to the codes present.

With respect to level j, it is required that:

$N_{min,j}$ is the value of MIND relating to its "2*(j−1)" most significant bits, and $C_{min,j}$ is the value of MIND relating to the 2 least significant bits, $N_{max,j}$ is the value of MAXD relating to its "2*(j−1)" most significant bits, and $C_{max,j}$ is the value of MAXD relating to the 2 least significant bits, $N_{rt,j}$ is the value of RT_PRI relating to its "2*(j−1)" most significant bits, and $C_{rt,j}$ is the value of RT_PRI relating to the 2 least significant bits.

One proceeds as follows:

The codes to the left of the code defined by "$C_{min,j}$" are ignored if $N_{nin,j}$=ELEMj, The codes to the right of the code defined by "$C_{max,j}$" are ignored if $N_{max,j}$=ELEMj.

Phj only takes into account only the remaining codes for that which follows.

If V/CD=VBR, Phj chooses the priority code in the following manner: "$C_{rt,i}$" turns to the right are first made with the priority codes.

The number of the chosen location is that which contains a date that is lower than the current date Dc and which has the most priority. The number of this location is then concatenated to ELEMj with its least significant bits and then goes to the stage j+1. If other locations contain a lower date than the current date Dc, the number of the location having the lowest priority of them is concatenated to ELEMj to form RSPRI. In the opposite case, "00" is concatenated to the former value of RSPRI.

If V/CD=CBR, Phj chooses the priority code by choosing simply the lowest date.

The number of its associated location is then concatenated to ELEMj with its least significant bits and then goes to stage j+1. "$C_{rt,j}$" and RSPRI are not evaluated.

The following three examples represent that which has just been described.

a) Determining RSPRI and ELEM for RT_PRI="00 ... 00".

Figure 8:
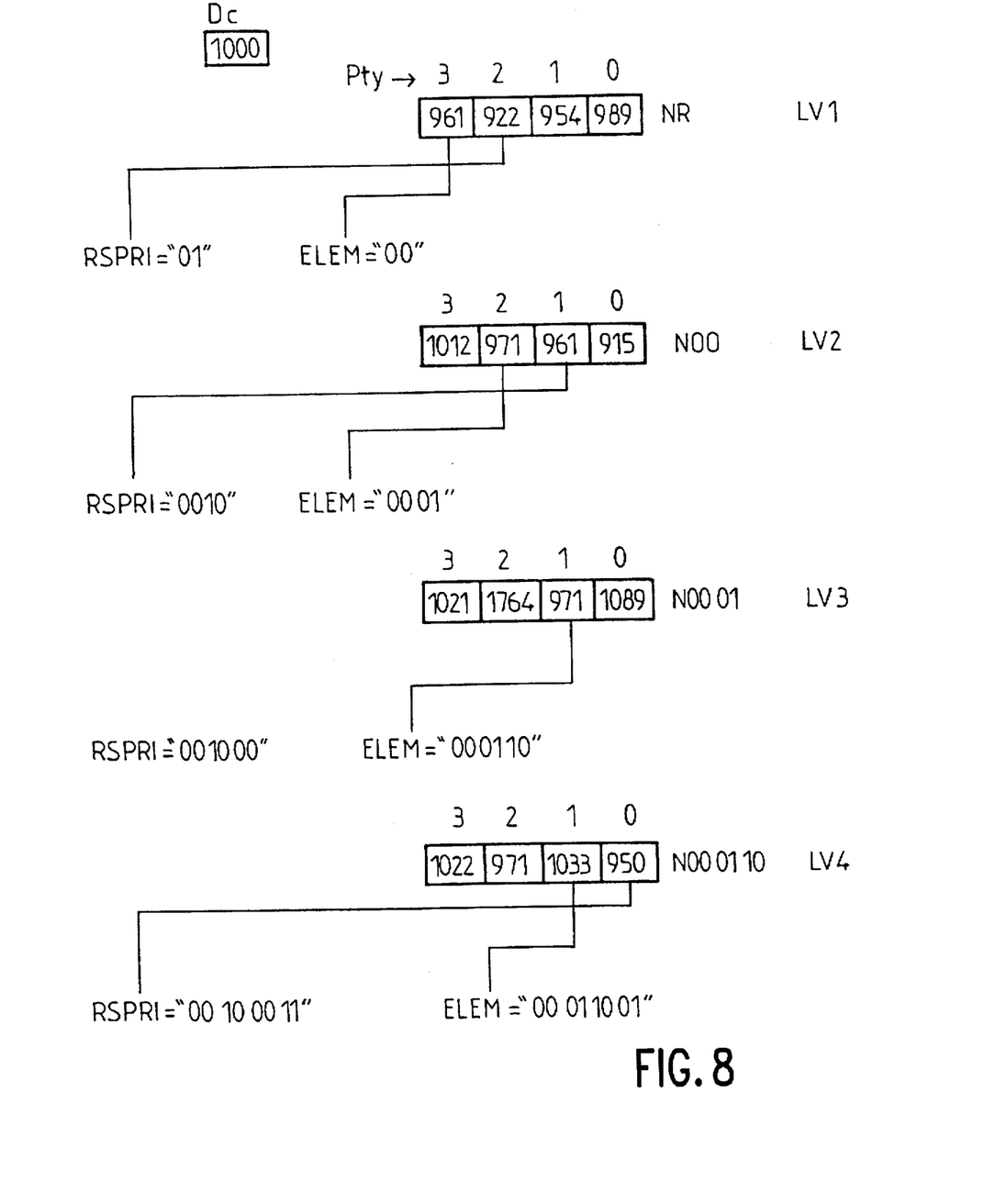
FIG. 8 shows a first operating mode of the tree circuit.

Reference is made to FIG. 8 for the explanation. In this Figure, reference K0 represents the value of the current date "Dc", reference K1 represents the values of the locations of the root node NR. Each location is numbered from "00" to "11" in binary notation from left to right and is assigned a priority number "Pty" running from 3 to 0 in decimal notation from left to right. A high priority number indicates a high priority. Only the locations containing a date lower than the current date Dc are considered. As the locations of the node NR contain only dates lower than the date "Dc", the date 961 having priority 3 is chosen, of which the location is numbered "00": this forms the first two bits of the code ELEM. Then is chosen the lower-priority date, that is, 922, which corresponds to location "01" having priority 2. The first two bits of RSPRI are thus "01". Then the node of the level LV2 is proceeded to. The number of the node is given by the value ELEM, thus node N00 is considered. Here it will be obvious that the date having the highest priority is not suitable, because its value 1012 is higher than the current date. If one goes back to the date 971, having priority 2, which is situated at location "01", the code ELEM becomes "00 01". The value of RSPRI passes "00 10", because the location "10" corresponds to the lower priority. Then level LV3 is proceeded to, where the node N0001 defined by the code ELEM established above is considered. This node N0001 contains only one date 971 which is lower than the current date. As this date is situated at the location "10", the code ELEM becomes ELEM="00 01 10". Under these circumstances "00" is added by concatenation to the value RSPRI already evaluated, so that RSPRI="00 10 00".

Then level LV4 is proceeded to where the node N000110 is considered. This node contains two dates lower than the current date. One thus chooses the date 971 which corresponds to the location "01" having priority 2, that is, the new value of ELEM="00011001". Subsequently, the lower priority is chosen, that is, 950, which corresponds to the location "11". A new value of RSPRI is thus "00011011". It should be noted that, contrary to ELEM which is extended by two bits for each stage without a modification of the previously acquired bits, the value of RSPRI is changed by concatenating the node—thus by erasing the previous value—and the location of the chosen element with second priority. One proceeds in this manner up to the level of the leaves.

b) Determination of RSPRI and ELEM for RT_PRI="01101 ... ".

Figure 9:
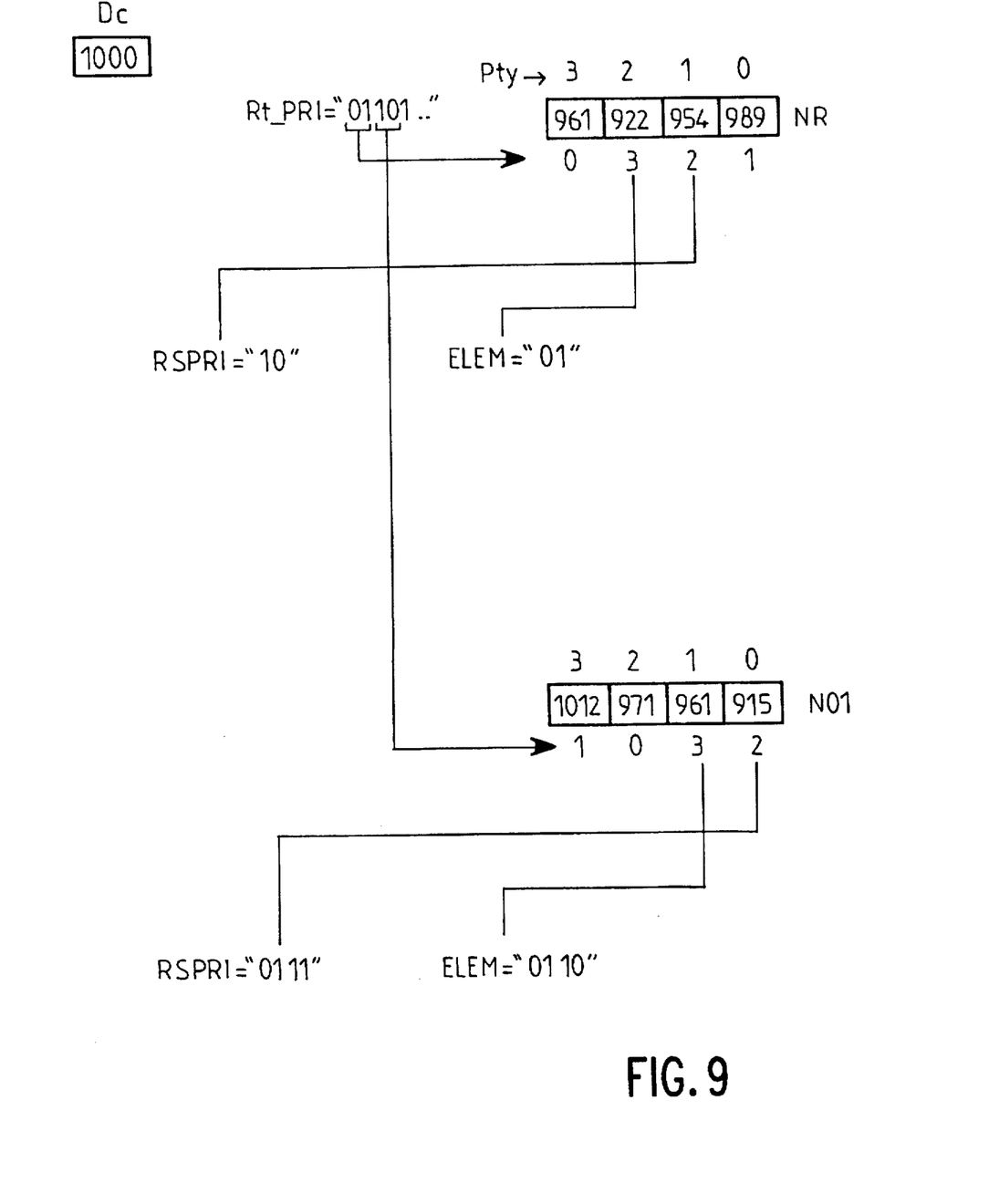
FIG. 9 shows a second operating mode of the tree circuit.

Reference is now made to FIG. 9. The same root node as in the preceding Figure is considered. This time the initial priority is modified by the first two bits of the code RT_PRI. As these bits are "01", the priority codes are shifted to the right, so that the date 922 gets the highest priority and the date 954 the next priority, so that ELEM="01" and RSPRI= "10". For the level LV2, the selected location is "10", which corresponds to the highest priority, because the priorities have been changed by the third and fourth bits which follow, that is: "10", finally there is obtained RSPRI="0111" and ELEM="0110".

c) Determining RSPRI and ELEM for RT_PRI="0110 ... " taking into account MIND and MAXD.

Figure 10A:
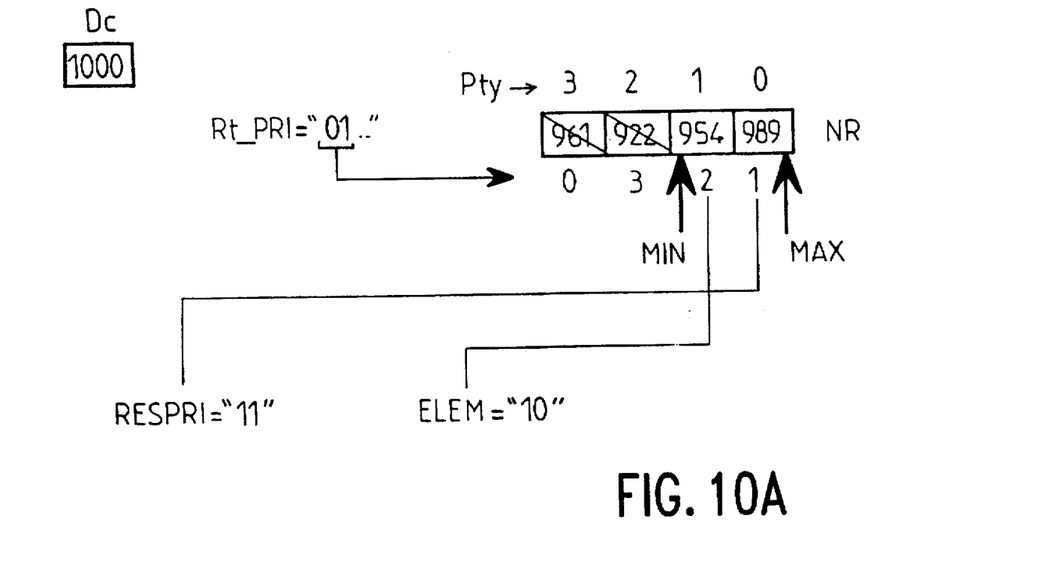
FIG. 10A and 10B show a third operating mode of the tree circuit.

Reference is made to FIG. 10A. It is supposed that the first two bits having the value MIND are "10", that is to say, this value points at the date 954, all the dates situated to the left of this value are invalidated as is indicated by the lines through the dates 961 and 922. The first two bits of the value MAXD are "11", so that none of the date bits is invalidated by MAXD. The bits of RT_PRI that relate to the node NR are "01", so that the priority values are shifted. As the date having the highest priority 922 is crossed out, the date 954 having second priority is taken and the bits of RSPRI represent the location having the priority "11".

Figure 10B:
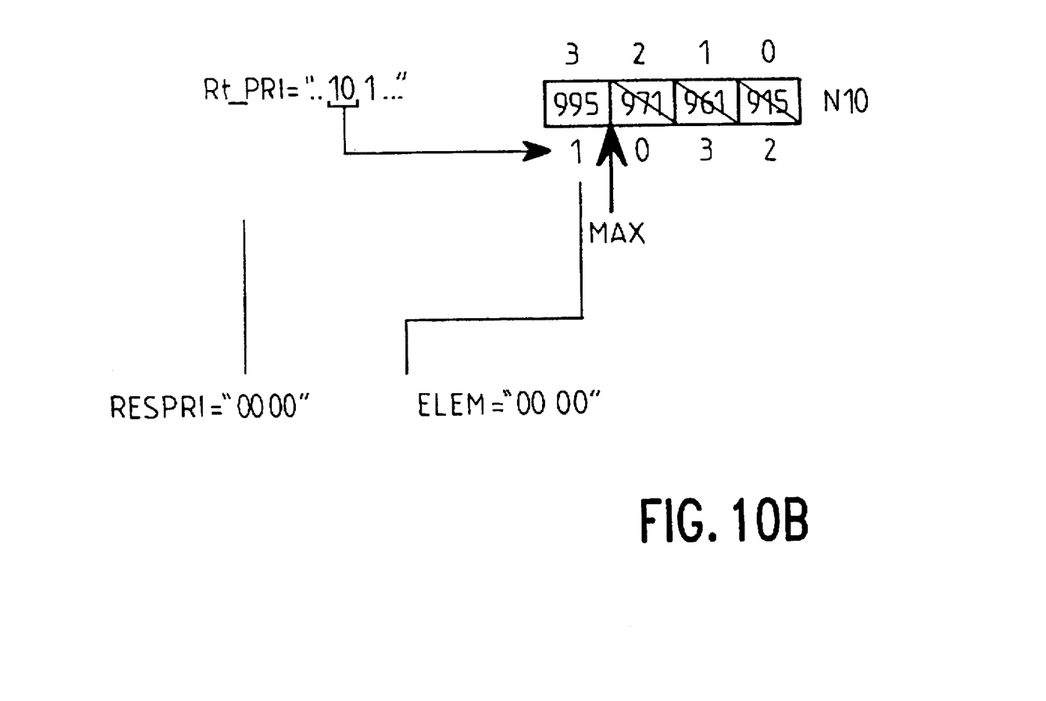

Reference is made to FIG. 10B. MIND is supposed to be equal to "0010 ... " and MAXD to "1000 ... ", and the node N10 of LV1 is considered. Only MAXD is taken into consideration, because the value of the node "10" is equal to that contained in MAXD in its two most significant bits. The dates standing to the right of the arrow MAX are crossed out, that is: 971, 961 and 915. Only the date 995 remains, which results in the two bits "00" for ELEM. Since there is no date having a lower priority, RESPRI thus has the bits "00" concatenated to its previous value.

The circuits thus described permit to operate as a pipeline if registers referenced PA6.5, PB6.5 and PC6.5 in FIG. 7 are utilized. That is to say, while one processor manages a code, the next processor manages a preceding code. The fact that one processor is taken for each level of the tree permits to increase the rate of the notifications introduced in the tree circuit. If this rate is low, a person skilled in the art will not find any difficulty in diminishing the number of gates used by the device by assigning various stages to the same processor. One will find that the root-leaves processing will take account of an updating with a code after its leaves-root processing.

The dates are coded in "N" bits in the tree. This quantity depends on the lowest rates one wishes to process. Two additional Booleans +∞/−∞ make it possible to declare a date that can never be chosen (always higher than the current date) and a date that can always be chosen (always lower than the current date), respectively.

It should be observed that the device supports a date coding with 0 bits, the date permitting to be summarized to the Booleans +∞/−∞ possibly coded with 1 bit and marking the absence (+∞) or the presence (−∞) of stand-by cell(s) for a virtual circuit: the interest of the device is no longer its cell spacing function (which can be realized upstream of a device), but its capacity to select a part of the virtual circuits and choose a priority bit therefrom.

CALCULATION ELEMENT 410

Figure 11:
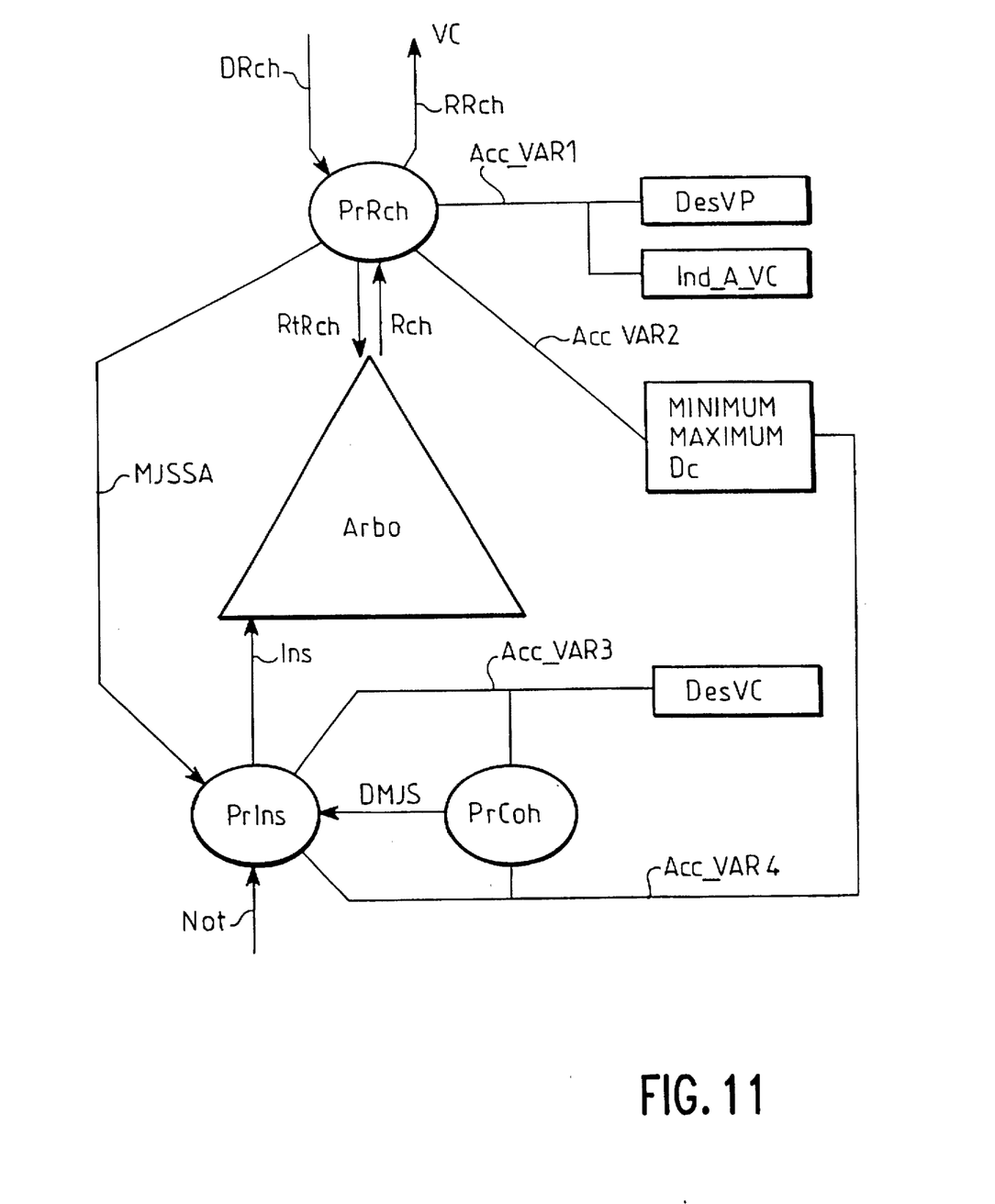
FIG. 11 shows the function relations established by the calculation circuit.

FIG. 11 shows the logic structure of this element. The element is established around three drivers which drive concurrently. These processes communicate by mailbox. They interact with the Arbo function produced by tree 400 via primitives Rch and Ins, and the result RtRch which have just been described. A person of ordinary skill in the art will not find any difficulty in translating into HDL (Hardware Description Language) to "compile" them on silicon.

Among these various drivers there are distinguished:

PrRch: search driver. This process cooperates, on the one hand, with a describer of VP (DesVP) and indirect variables Ind_A_VC (link Acc_VAR1) and, on the other hand, with the current date "Dc" produced by the date counter 405 and the values MINIMUM and MAXIMUM which define the sub-trees (link Acc_VAR2). This process triggers the search Rch for the Arbo function and restores therefrom the result RtRch. This process receives search requests by a link DRch and supplies the final result by a link RRch. It also communicates by a link MJSSA with a process PrIns.

PrIns: insertion driver which triggers the date insertions in the Arbo tree function via the link that corresponds to the function Ins. This process communicates with a VC describer table, called DesVC, via the link Acc_VAR3 and also via the variables MINIMUM, MAXIMUM, and Dc via the link Acc_VAR4. It is triggered after a notification coming from the line 260 (cf. FIG. 3), which is indicated by the link Not. This process is also triggered by the process PrRch, as observed above. It is finally triggered by a process PrCoh (link DMJS).

PrCoh: coherence driver which updates the various dates in the tree circuit 400. Below, these various drivers will be shown in detail.

a) Insertion Driver

The insertion driver has for its function to update a describer of each VC and to update the tree by insertions. It comprises the describer table VC (DesVC) indexed by the notification number (equivalent to the number VC).

The form of a describer is given in the following Table I:

TABLE I

| Type_VC | selection VBR/CBR |
|---|---|
| PT_PCR | input sub-tree PCR |
| PT_SCR | input sub-tree SCR |
| PT_CBR | input sub-tree CBR |
| Stop_CBR | maximum permissible jitter in CBR mode |
| Stop_date_CBR* | maximum theoretical send date sub-tree CBR |
| Th_PCR* | minimum theoretical send date sub-tree PCR |
| Th_SCR* | minimum theoretical send date sub-tree SCR |
| PCR_period | Sub-tree period PCR |
| SCR_period | Sub-tree period SCR |
| Cell_counter | cell counter for this VC |
| Burst-time | maximum permissible burst time PCR |

*These variables have two markers +∞ and −∞.

The set of functions EFunc1 executed upon the arrival of a notification "i" (Not) is the following:

EFunc1

```
START
Cell_counter [i] = Cell_counter [i] + 1
if Cell_counter [i] = 1
        if Type_VC[i] = CBR
            then
                Stop_date_CBR[i] = DC+Stop CBR[i]
                "Ins" (PT_CBR[i], Stop_date_CBR[i], TRUE, MINIMUM,
                MAXIMUM)
            else
                calculate and update Th_PCR[i] and Th_SCR[i] as a function
                of table II
                "Ins" (PT_PCR[i], Th_PCR[i], TRUE, MINIMUM,
                MAXIMUM)
                "Ins" (PT_SCR[i], Th_SCR[i], TRUE, MINIMUM,
                MAXIMUM)
            endif
endif
END
```

The set of functions EFunc2 carried out upon the arrival of a request for updating coming from the search process with a VC having number 'i', transmitted by the link MJSSA, is the following:
 EFunc2

```
START
Cell_counter [i] = Cell_counter [i] - 1
if Cell_counter [i] < > 0
     then
          if Type_VC[i] = CBR
               then
                    Stop_date_CBR[i] = DC + Stop_CBR[i]
                    "Ins" (PT_CBR[i], Stop_date_CBR[i], TRUE,
                    MINIMUM, MAXIMUM)
               else
                    calculate and update Th_PCR[i] and Th_SCR[i] as
                    a function of Table II.
                    "Ins" (PT_PCR[i], Th_PCR[i], TRUE,
                    MINIMUM, MAXIMUM)
                    "Ins" (PT_SCR[i], Th_SCR[i], TRUE,
                    MINIMUM, MAXIMUM)
               endif
     else
          if Type_VC[i] = CBR
               then
                    "Ins" (PT_CBR[i], + ∞, TRUE,
                    MINIMUM, MAXIMUM)
               else
                    "Ins" (PT_PCR[i], + ∞, TRUE,
                    MINIMUM, MAXIMUM)
                    "Ins" (PT_SCR[i], + ∞, TRUE,
                    MINIMUM, MAXIMUM)
          endif
endif
END
```

The set of functions EFunc3 carried out upon the arrival of a request for selecting a sub-tree coming from the search process is the following:

EFunc3

```
START
"Ins" (MINIMUM, xxx, FALSE, MINIMUM, MAXIMUM)
"Ins" (MAXIMUM, xxx, FALSE, MINIMUM, MAXIMUM)
END
```

The set of functions EFunc4 carried out upon the arrival of a request to update coming from the coherence process (link DMJS) is the following:

EFunc4

```
START
if Type_VC[i] = CBR
     then
          "Ins" (PT_CBR[i], - ∞, TRUE, MINIMUM, MAXIMUM)
     else
          "Ins" (PT_SCR[i], - ∞, TRUE, MINIMUM, MAXIMUM)
          "Ins" (PT_PCR[i], - ∞, TRUE, MINIMUM, MAXIMUM)
endif
END
```

The calculation of the new values of Th_SCR and Th_PCR for a given VC is shown in the following Table II

TABLE II

| Th_SCR + SCR_period < Dc | Th_PCR + PCR_period < Dc | Th_SCR + SCR_period <Dc + Burst_time | New values of Th_SCR and Th_PCR | |
|---|---|---|---|---|
| no | no | no (PCR burst forbidden) | Th_SCR = | Th_SCR + SCR_period |
| | | | Th_PCR = | Dc + SCR_period |
| no | no | yes (PCR burst permitted) | Th_SCR = | Th_SCR + SCR_period |
| | | | Th_PCR = | Th_PCR + PCR_period |
| no | yes (ruptured stream) | no (PCR burst forbidden) | Th_SCR = | Th_SCR + SCR_period |
| | | | Th_PCR = | Dc + SCR_period |
| no | yes (ruptured stream) | yes (PCR burst permitted) | Th_SCR = | Th_SCR + SCR_period |
| | | | Th_PCR = | Dc |
| yes (ruptured stream) | no | — | Th_SCR = | Dc (impossible case) |
| | | | Th_PCR = | Dc (SCR_period >PCR_period) |
| yes (ruptured stream) | yes (ruptured stream) | — | Th_SCR = | Dc |
| | | | Th_PCR = | Dc |

Dc: Current date

The device receives in the search phase an argument VP which indicates in which sub-set of VC (the VCs contained in this VP) the selection of the VC has taken place.

Each VP possesses a describer (DesVP) with the following arguments:

TABLE III

| | |
|---|---|
| PTmin_PCR | minimum pointer of the VP sub-tree PCR |
| PTmax_PCR | maximum pointer of the VP sub-tree PCR |
| PTmin_SCR | minimum pointer of the VP sub-tree SRC |
| PTmax_SCR | maximum pointer of the VP sub-tree SCR |
| PTmin_CBR | minimum pointer of the VP sub-tree CBR |
| PTmax_CBR | maximum pointer of the VP sub-tree CBR |
| ROT_SCR* | turning priority index on sub-tree SCR |
| ROT_PCR* | turning priority index on sub-tree PCR |

TABLE III-continued

| | |
|---|---|
| OPT_ROT_SCR | turning priority activation/inactivation Boolean SCR |
| OPT_ROT_PCR | turning priority activation/inactivation Boolean PCR |

*ROT_SCR and ROT_PCR are initialized at 0 at the start.

An appended table Ins_A_VC permits to find back a VC on the basis of one of its leaf elements in the tree.

The set of functions EFunc5 carried out upon the arrival of a search request in a given VP (link "DRch") denoted 'i' is the following:

EFunc5

```
START
y = -1 (impossible value)
MINIMUM = PTmin_CBR[i]
MAXIMUM = PTmax_CBR[i]
send a request for selecting a sub-branch to the inserting process
wait for its execution, that is to say, the root date is to be updated.
ifRoot_date < >+ ∞
then
        "Rech" (CBR,MINIMUM, MAXIMUM,xxx)
        the search return gives 'y' the number of the chosen leaf in the tree.
else
        MINIMUM = PTmin_SCR[i]
        MAXIMUM = PTmax_SCR[i]
        send a request to select a sub-tree to the insertion process;
        wait for its execution, that is, the root date is to be updated.
        If Root_date (< or =) Current date
        then
                "Rech (VBR, MINIMUM, MAXIMUM ROT_SCR[i])
                the search return gives 'y' the number of the chosen leaf in the tree.
                the return gives 'resprio' which is the priority index found.
                if OPT_ROT SCR[i] = TRUE
                        then ROT_SCR[i] = resprio
                endif
        else
                MINIMUM = PTmin_PCR[i]
                MAXIMUM = PTmax_PCR[i]
                Send a tree selection request ss to the insertion process; wait for its
                execution, that is, the root date is to be updated.
                if Root_date (< or =) Current date
                then
                        'Rech' (VBR, MINIMUM, MAXIMUM, ROT_PCR[i] )
                        the search return gives 'y' the number of the chosen leaf in the
                        tree.
                        the return gives resprio the priority index found
                        if OPT_ROT_PCR[i] = TRUE
                        then
                                ROT_SCR[i] = resprio
                        endif
                endif
        endif
endif
if y <>-1
        then
                vc_found = Ind_A_VC
                        send an update request with vc_found to the insertion process
                        vc_found is the VC number returned by the device in "RRch"
        else
                no VC is returned by the device, because no one can be
                selected.
endif
END
```

This process scans the various VCs and "cleans" the dates becoming too negative relatively to the current date. This process is slow and can take various milliseconds to scrutinize all the VCs.

The associated set of functions EFunc6 is the following, with N being the number of VCs tested by the device:

EFunc6

```
START
for i running from 0 to N-1
    repeat
        if Type_VC = CBR
            then
                if Stop_date_CBR[i] _Current date < THRESHOLD
                    then
                        Stop_datae_CBR[I] = —∞
                        request the insertion driver for an insertion with 'i'
                    endif
            else
                if Th_PCR[i] - Current date< THRESHOLD or Th_SCR[i] -
                Current date < THRESHOLD
                    then
                        Th_PCR[i] = —∞
                        Th_SCR[i] = —∞
                        request the insertion driver for an
                        insertion with 'i'
                    endif
            endif
    end-of-repetition
END
```

In a simplified version, the device can function very well without a notification with all or part of its service circuits. In the mode called "autonotified", the tree is supplied a first time to "trigger" its service circuits without notification. The calculation element does not take into consideration the cell counter in the stand-by mode which is associated to each "autonotified" service circuit, so that the latter are periodically chosen in the tree, even if there are no stand-by cells.

Direct access to the table which contains the period of each service circuit renders the modification of the rates direct and makes the system attractive to apply the methods of flow control which necessitate a rapid rate variation without much jitter.

I claim:

1. A communication system comprising a network of the ATM type in which information cells having a first destination identifier (VP) which defines a first set of destinations, and a second destination identifier (VC) which defines a sub-set of the first set, are transmitted from one of said network's access points to another access point, and a multiplexing device comprising:

a plurality of access terminals for users who have cells to be transmitted at a certain rate to a certain destination defined by the destination identifiers, at least one connecting terminal for at least one access point of said network, a plurality of service circuits connected to the access terminals, comprising queue elements for storing each of the user cells which have the same destination identifiers, and for rendering the stored cells available on cell outputs, an allocation circuit for determining at a current date the supply of a cell, called chosen cell, selected from the available cells to said connecting terminal via an output circuit, wherein the allocation circuit includes a circuit for producing a first destination identifier a theoretical date determining circuit (EFunc1) for determining a theoretical date for the transmission of the available cells of each service circuit as a function of, more particularly, the certain rate, a tree circuit presenting (i) "leaves" for receiving the theoretical dates for each service circuit, (ii) a root for containing dates called root dates, on the basis of which dates a date called priority date is established from the theoretical dates, and (iii) nodes established in layers and connecting said leaves to said root, a sub-tree circuit for selecting leaves from the leaves of the tree circuit in response to the first destination identifier, and for creating a partition in the first destination identifier, and a root date determining circuit for determining at least one root date in said partition.

2. The communication system as claimed in claim 1, wherein the sub-tree circuit further comprises means for establishing a turning priority for each layer under the influence of an extraction circuit.

3. The communication system as claimed in claim 1, wherein the tree circuit is formed by processors, each of which being assigned to one of said layers.

4. A multiplexing circuit which transmits from one of its access points to another access point information cells which contain a first destination identifier (VP) defining a set of destinations and a second destination identifier (VC) defining a sub-set of said destination set and formed by a plurality of access terminals for users who have cells to be transmitted at a certain rate to a certain destination defined by said destination identifiers, at least one connecting terminal for at least one access point of a network, a plurality of service circuits connected to the access terminals, comprising queue elements for storing each the user cells which have the same destination identifiers and for rendering the stored cells available on cell outputs, an allocation circuit for determining at a current date the supply of a cell, called chosen cell, selected from the available cells to said connecting terminal via an output circuit, which allocation circuit includes a circuit for producing a first destination identifier, a theoretical date determining circuit (EFunc1) for determining a theoretical date for the transmission of the available cells of each service circuit as a function of, more particularly, the certain rate, a tree circuit presenting (i) "leaves" for receiving the theoretical dates for each service circuit, (ii) a root for containing dates called root dates, on the basis of which dates a date called priority date is established from the theoretical dates, and (iii) nodes established in layers and connecting said leaves to said root, a sub-tree circuit for selecting leaves from the leaves of the tree circuit in response to the first destination identifier, and for creating a partition in the first destination identifier, and a root date determining circuit for determining at least one root date in said partition.

5. The multiplexing circuit as claimed in claim 4, wherein the sub-tree circuit further comprises means for establishing a turning priority for each layer under the influence of an extraction circuit.

* * * * *